US012260413B2

(12) United States Patent
Mattison et al.

(10) Patent No.: US 12,260,413 B2
(45) Date of Patent: Mar. 25, 2025

(54) SYSTEM AND METHOD FOR EXPEDITED DATA TRANSFER UTILIZING A SECONDARY ELECTRONIC DATA LOG

(71) Applicant: BANK OF AMERICA CORPORATION, Charlotte, NC (US)

(72) Inventors: Paul Martin Mattison, Sherrills Ford, NC (US); Martha Sain McClellan, Lancaster, SC (US); Yash Sharma, Delhi (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 241 days.

(21) Appl. No.: 17/674,329

(22) Filed: Feb. 17, 2022

(65) Prior Publication Data
US 2023/0259946 A1    Aug. 17, 2023

(51) Int. Cl.
*G06Q 20/40* (2012.01)
*G06Q 20/38* (2012.01)

(52) U.S. Cl.
CPC ......... *G06Q 20/403* (2013.01); *G06Q 20/389* (2013.01); *G06Q 20/401* (2013.01); *G06Q 20/405* (2013.01)

(58) Field of Classification Search
USPC .......................................................... 705/39
See application file for complete search history.

(56) References Cited

U.S. PATENT DOCUMENTS

| | | | | |
|---|---|---|---|---|
| 10,437,630 B2* | 10/2019 | Curtis | ..................... | G06F 9/466 |
| 2021/0073808 A1* | 3/2021 | Gu | ......................... | G06Q 20/367 |
| 2022/0129889 A1* | 4/2022 | Sarin | ...................... | H04L 9/0637 |
| 2023/0070215 A1* | 3/2023 | Richter | ............. | G06Q 20/3223 |
| 2023/0073140 A1* | 3/2023 | Richter | .................. | G06Q 20/02 |

FOREIGN PATENT DOCUMENTS

WO    WO-2016200687 A1 * 12/2016 ............. G06Q 40/04

* cited by examiner

*Primary Examiner* — Paul S Schwarzenberg
(74) *Attorney, Agent, or Firm* — Moore & Van Allen PLLC; Nicholas C. Russell

(57) ABSTRACT

Systems, computer program products, and methods are described herein for expedited data transfer utilizing a secondary data log. The present invention may be configured to analyze a primary data log and determine a user having a high volume of data transactions within a defined timeframe. The present invention may be further configured to maintain a secondary data log for a predetermined time period and, upon conclusion of the predetermined time period, sum the data transactions from the secondary data log and record the sum on the primary data log. The present invention may be further configured to determine a pre-authorized credit for the user to be recorded on the secondary data log during the predetermined time period.

20 Claims, 3 Drawing Sheets

SYSTEM AND METHOD FOR EXPEDITED DATA TRANSFER UTILIZING A SECONDARY ELECTRONIC DATA LOG

FIELD OF THE INVENTION

The present invention embraces an electronic system for utilizing a secondary electronic data log to improve the transfer of data.

BACKGROUND

With an increasing number of connected devices, people are more connected than ever. Some people may send and receive data many times in a single day. These transactions can be computationally expensive. There is a need to reduce the time and computational burden associated with users with a high number of data transactions in a given time period.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, a system for expedited data transfer is presented. The system may include at least one non-transitory storage device and at least one processing device coupled to the at least one non-transitory storage device, where the at least one processing device may be configured to: analyze a primary data log, determine a user having a high volume of data transactions within a defined time period, maintain a secondary data log for the user during a predetermined time period, determine a sum for the secondary data log upon conclusion of the predetermined time period, and record the sum on the primary data log. The primary data log comprises incoming data transactions and outgoing data transactions for a group of users. The secondary data log comprises incoming data transactions and outgoing data transactions for the user.

In some embodiments, prior to analyzing the primary data log, the at least one processing device may be further configured to receive a request from the user. In some embodiments, the at least one processing device may be further configured to determine, based on the high volume of data transactions within a defined timeframe, a pre-authorized credit for the user during the predetermined time period. In some embodiments, the pre-authorized credit may be listed on the secondary data log for the user.

In some embodiments, the pre-authorized credit may be determined using a machine learning algorithm. In some embodiments, determining the user with a high volume of data transactions during a defined time period may include using a machine learning algorithm. In some embodiments, the secondary data log may be a distributed ledger. Additionally, or alternatively, the secondary data log may be a centralized ledger.

In another aspect, a computer program product for expedited data transfer is presented. The computer program product may include a non-transitory computer-readable medium including code causing a first apparatus to: analyze a primary data log, determine a user having a high volume of data transactions within a defined time period, maintain a secondary data log for the user during a predetermined time period, determine a sum for the secondary data log upon conclusion of the predetermined time period, and record the sum on the primary data log. The primary data log comprises incoming data transactions and outgoing data transactions for a group of users. The secondary data log comprises incoming data transactions and outgoing data transactions for the user.

In some embodiments, the non-transitory computer-readable medium may further include code causing a first apparatus to, prior to analyzing the primary data log, receive a request from the user. In some embodiments, the non-transitory computer-readable medium may further include code causing a first apparatus to determine, based on the high volume of data transactions within a defined timeframe, a pre-authorized credit for the user during the predetermined time period. In some embodiments, the pre-authorized credit may be listed on the secondary data log for the user.

In some embodiments, the pre-authorized credit may be determined using a machine learning algorithm. In some embodiments, determining the user with a high volume of data transactions during a defined time period may include using a machine learning algorithm. In some embodiments, the secondary data log may be a distributed ledger. Additionally, or alternatively, the secondary data log may be a centralized ledger.

In yet another aspect, a method for expedited data transfer is provided. The method may include: analyzing a primary data log, determining a user having a high volume of data transactions within a defined time period, maintaining a secondary data log for the user during a predetermined time period, determining a sum for the secondary data log upon conclusion of the predetermined time period, and recording the sum on the primary data log. The primary data log comprises incoming data transactions and outgoing data transactions for a group of users. The secondary data log comprises incoming data transactions and outgoing data transactions for the user.

In some embodiments, the method may further include, prior to analyzing the primary data log, receiving a request from the user. In some embodiments, the method may further include determining, based on the high volume of data transactions within a defined timeframe, a pre-authorized credit for the user during the predetermined time period. In some embodiments, the pre-authorized credit may be listed on the secondary data log for the user.

In some embodiments, the pre-authorized credit may be determined using a machine learning algorithm. In some embodiments, determining the user with a high volume of data transactions during a defined time period may include using a machine learning algorithm. In some embodiments, the secondary data log may be a distributed ledger. Additionally, or alternatively, the secondary data log may be a centralized ledger.

BRIEF DESCRIPTION OF THE DRAWINGS

Figure 1:
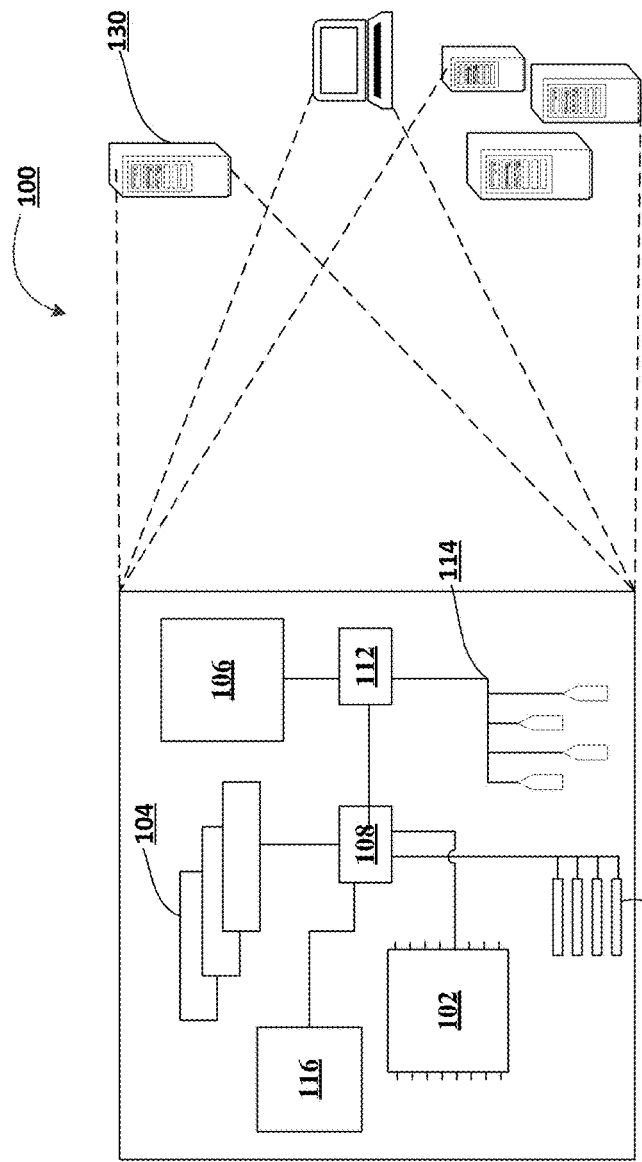
Figure 1:
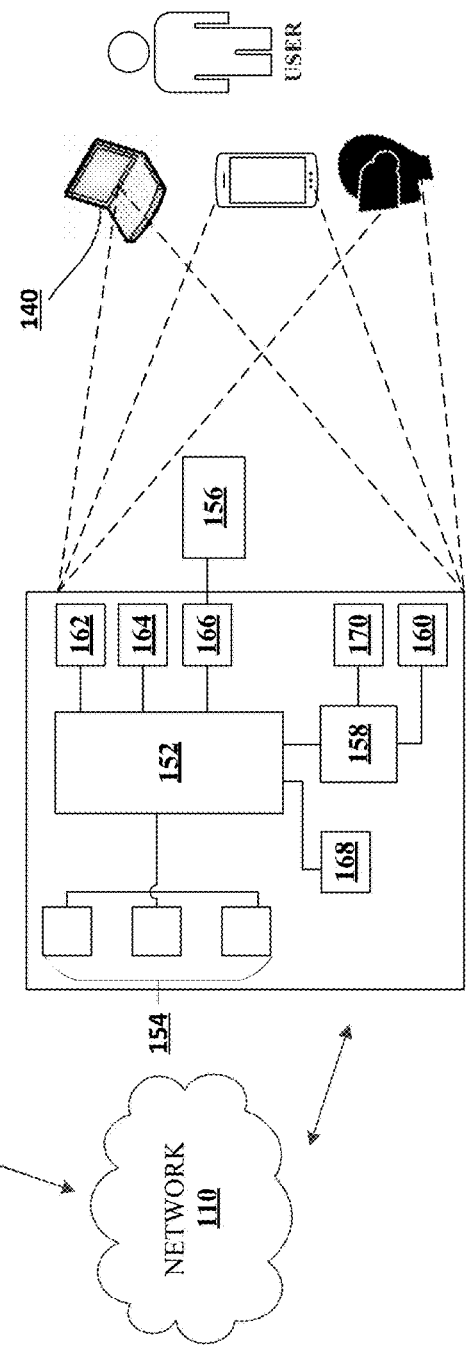
Figure 2:
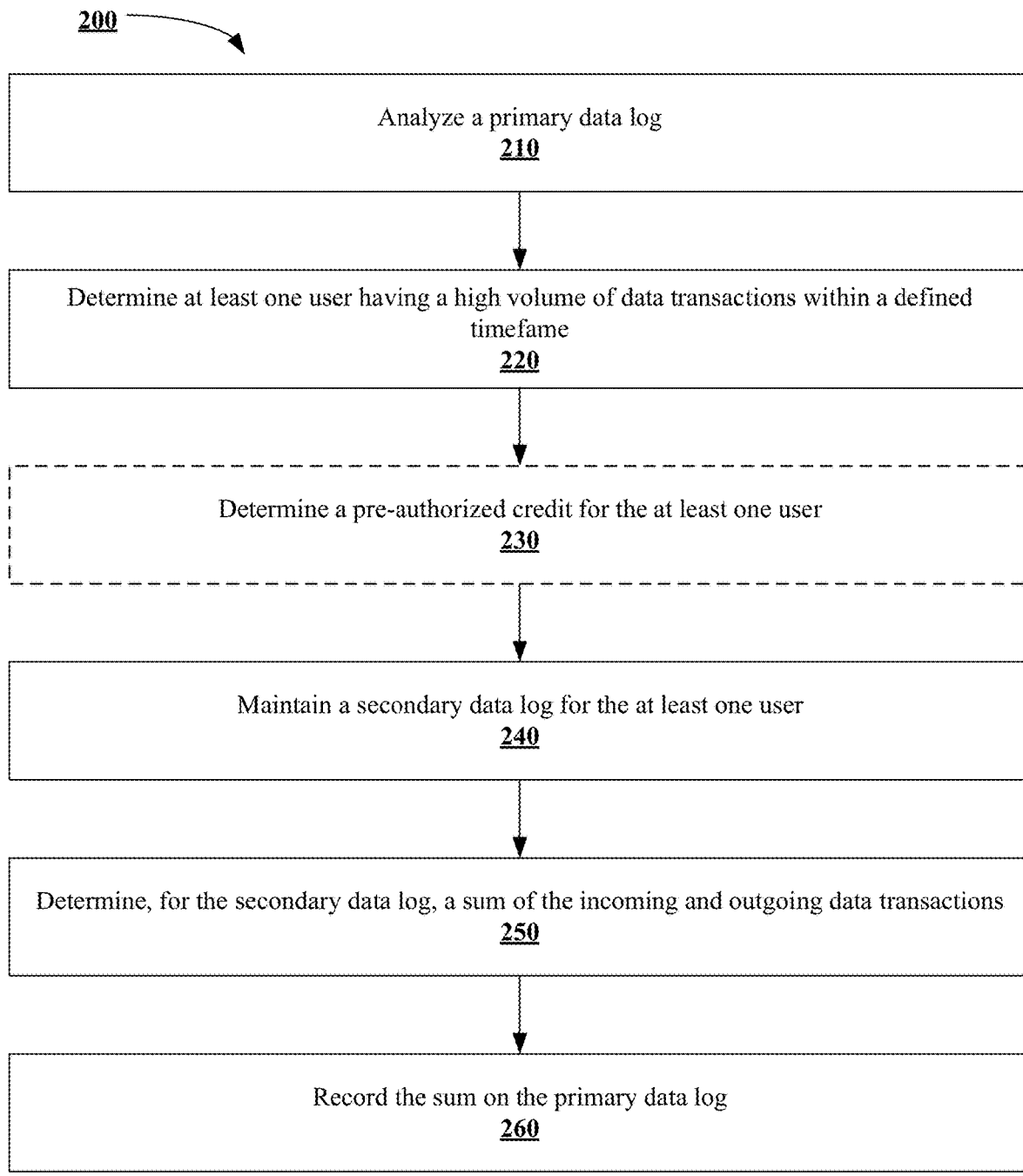
Figure 3:
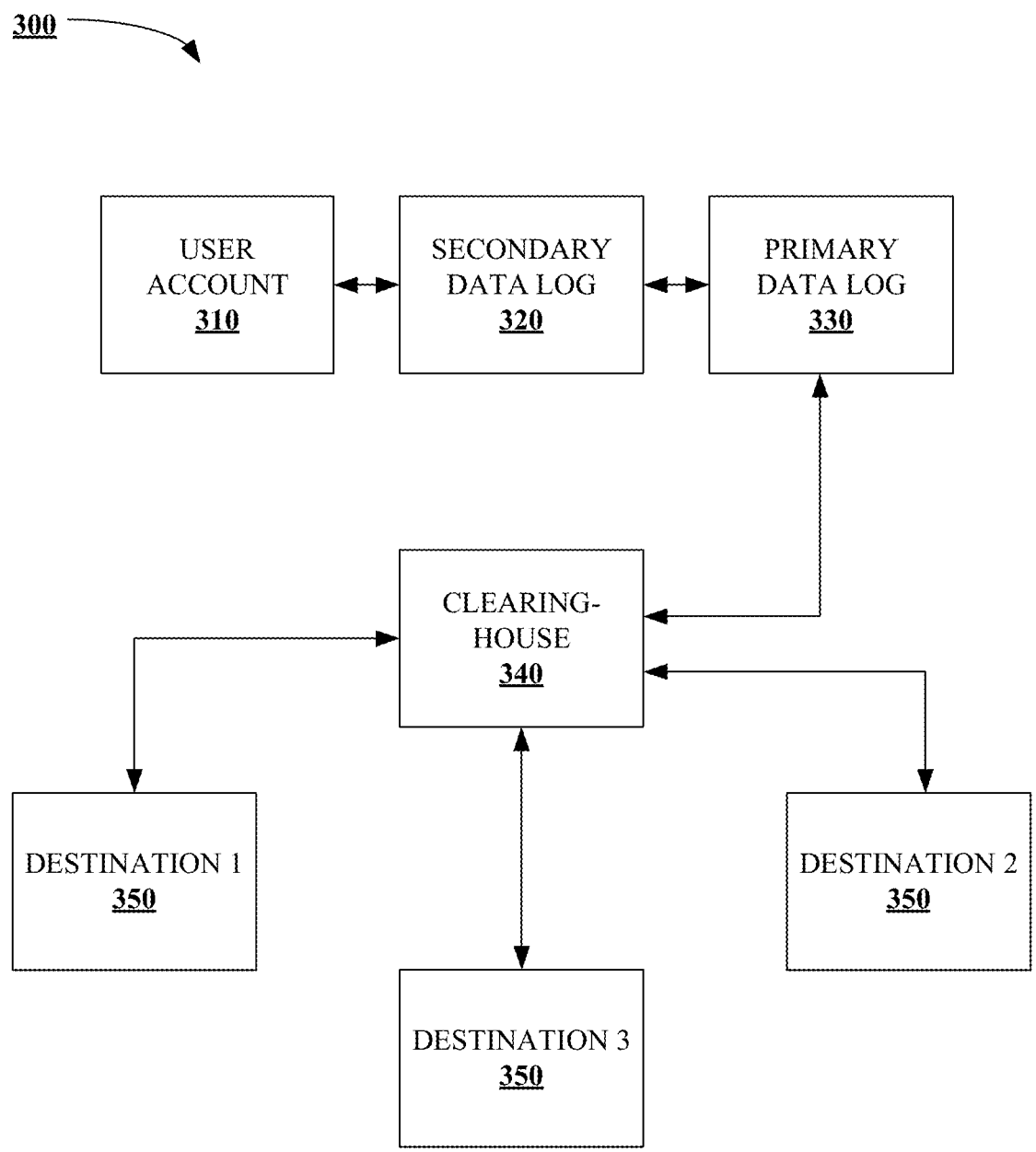

Having thus described embodiments of the invention in general terms, reference will now be made the accompanying drawings, wherein:

FIG. 1 illustrates technical components of a system for expedited data transfer, in accordance with an embodiment of the invention;

FIG. 2 illustrates a process flow for expedited data transfer, in accordance with an embodiment of the invention; and FIG. 3 illustrates a flow diagram for expedited data transfer utilizing the secondary data log, in accordance with an embodiment of the invention;

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Some users may conduct frequent data transactions on a daily basis. Every time a data transaction is processed, multiple systems need to be updated, thereby slowing down the process of conducting transactions. The present invention is configured to maintain a secondary log for these users, thereby reducing the frequency of multiple system updates. The system identifies users that are frequent senders and receivers and, in some instances, may typically transact the same amount. Instead of settling right away for these frequent senders and receivers, the system will have an open credit line, or preauthorized credit. Using a electronic funds data transaction as an example, if some users are receiving $2000 a day, the system marks $2000 credit in their secondary data log in an account management system. The system also records the outgoing transactions performed by those users and deducts the amount related to the outgoing transactions from the $2000 associated with their token. The system may never perform settlement process (unlike the RTP processing which typically occurs at the end of the day) which allows for faster transactions. The remaining net amount may remain in the user account and the user can use it for any other transactions.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or the like employing information technology resources for processing large amounts of data. In some embodiments, the entity may be an institution, group, association, financial institution, establishment, company, union, authority, merchant, service provider, and/or the like hosting, sponsoring, coordinating, creating, and/or the like events, recognitions, achievements, and/or the like.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein. In some embodiments, a user may be a verified authority as described herein.

As used herein, a "user interface" may be any device or software that allows a user to input information, such as commands and/or data, into a device, and/or that allows the device to output information to the user. For example, a user interface may include an application programmer interface (API), a graphical user interface (GUI), and/or an interface to input computer-executable instructions that direct a processing device to carry out functions. The user interface may employ input and/or output devices to input data received from a user and/or output data to a user. Input devices and/or output devices may include a display, API, mouse, keyboard, button, touchpad, touch screen, microphone, speaker, LED, light, joystick, switch, buzzer, bell, and/or other devices for communicating with one or more users.

As used herein, a "resource" may generally refer to objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as software, a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, a payment, processing of funds, purchase of goods or services, a return of goods or services, a payment transaction, a credit transaction, other interactions involving a user's resource or account, and/or the like. In the context of an entity such as a financial institution, a resource distribution and/or an allocation of resources may refer to one or more of a sale of goods and/or services, initiating an automated teller machine (ATM) or online financial session, an account balance inquiry, a rewards transfer, an account money transfer or withdrawal, opening a financial application on a user's computer or mobile device, a user accessing their e-wallet, any other interaction involving the user and/or the user's device that invokes and/or is detectable by the financial institution, and/or the like. In some embodiments, the user may authorize a resource distribution and/or an allocation of resources using a resource distribution instrument (e.g., credit cards, debit cards, checks, digital wallets, currency, loyalty points, and/or the like) and/or resource distribution credentials (e.g., account numbers, resource distribution instrument identifiers, and/or the like). A resource distribution and/or an allocation of resources may include one or more of the following: renting, selling, and/or leasing goods and/or services (e.g., groceries, stamps, tickets, DVDs, vending machine items, and/or the like); making payments to creditors (e.g., paying monthly bills; paying federal, state, and/or local taxes; and/or the like); sending remittances; loading money onto stored value cards (SVCs) and/or prepaid cards; donating to charities; and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In some embodiments, a resource distribution and/or an allocation of resources may refer to financial transactions involving direct or indirect movement of funds through traditional paper transaction processing systems (e.g., paper check processing) or through electronic transaction processing systems. In this regard, resource distributions and/or allocations of resources may refer to the user initiating a purchase for a product, service, or the like from a merchant. Typical financial resource distribution and/or financial allocations of resources include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, and/or the like. When describing that resource transfers or transactions are evaluated, such descriptions may mean that the transaction has already occurred, is in the process of occurring or being processed, or has yet to be processed/posted by one or more financial institutions.

As used herein, "resource distribution instrument" may refer to an electronic payment vehicle, such as an electronic credit, debit card, and/or the like, associated with a source retainer (e.g., a checking account, a deposit account, a savings account, a credit account, and/or the like). In some embodiments, the resource distribution instrument may not be a "card" and may instead be account identifying information stored electronically in a user device, such as payment credentials and/or tokens and/or aliases associated with a digital wallet, account identifiers stored by a mobile application, and/or the like.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a token, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

As used herein, identifiers such as "first," "second," "third," and/or the like do not indicate a temporal relationship, unless explicitly stated. Such identifiers may modify instances of similar things and may be used to differentiate between each of the instances.

As used herein, a "subset" may refer to one or more from a group. For example, a subset of users from a group of users may be one user from the group of users, multiple users from the group of users, or all of the users from the group of users. As another example, a subset of properties may be one property from the properties, multiple properties from the properties, or all of the properties.

FIG. 1 presents an exemplary block diagram of a system environment 100 for expedited data transfer utilizing a secondary data log, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, and/or the like changes and/or modifications to one or more systems, applications, services, and/or the like. The one or more systems, applications, services, and/or the like may be configured to communicate with the system 130, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology.

In some embodiments, the system 130 and the user input system 140 may be used to implement processes described herein, including user-side and server-side processes for expedited data transfer utilizing a secondary data log in accordance with an embodiment of the present invention. The system 130 may represent various forms of digital computers, such as laptops, desktops, workstations, personal digital assistants, servers, blade servers, mainframes, and/or the like. The user input system 140 may represent various forms of mobile devices, such as personal digital assistants, cellular telephones, smartphones, smart glasses, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The memory 104 may store information within the system 130. In one implementation, the memory 104 may be a volatile memory unit or units, such as volatile random-access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment may 100 include one or more user input systems and/or one or more data transaction systems (e.g., similar to the system 130 and/or the user input system 140) associated with an entity (e.g., a business, a merchant, a financial institution, a card management institution, an software and/or hardware development company, a software and/or hardware testing company, and/or the like). For example, a user (e.g., an employee, a customer, and/or the like) may use a user input system (e.g., similar to the user input system 140) to initiate data transactions and/or the like using one or more systems, applications, services, and/or the like (e.g., similar to the system 130, running a system similar to the system 130, and/or the like) and the user input system may provide information (notifications, secondary log data, etc) to a data transaction system (e.g., similar to the system 130, running a system similar to the system 130, and/or the like). In some embodiments, the user input system and/or the data transaction system associated with the entity may perform one or more of the steps described herein with respect to the process flows described herein with respect to FIGS. 2, 3, and/or 4.

FIG. 2 illustrates a process flow 200 for expedited data transfer utilizing a secondary data log, in accordance with an embodiment of the invention. In some embodiments, the data transaction system and/or the like (e.g. similar to one or more of the systems described herein with respect to FIG. 1) may perform one or more of the steps of process flow 200.

As shown in block 210, the process flow 200 may include analyzing a primary data log. The primary data log may comprise incoming transactions and outgoing transactions for multiple users.

As shown in block 220, the process flow 200 may include determining at least one user. The user will have a high volume of data transactions within a defined timeframe. In some embodiments, the defined timeframe will be hours, for example eight hours. In some embodiments, the defined timeframe will be a day or twenty-four hours. In some embodiments, the defined timeframe will be more than a day or twenty-four hours.

As shown in block 240, the process flow 200 may include maintaining a secondary data log for the at least one user. The secondary data log may be used to record the user's data transactions during a predetermined time period. The time period may be predetermined based on the amount or number of incoming and outgoing transactions during a defined timeframe. In some embodiments, the predetermined time period is requested by the user. In some embodiments, the predefined time period may be hours. In some embodiments, the predefined time period may be a day or twenty-four hours. In some embodiments, the predefined time period may be a week. In some embodiments the predefined time period may be a month.

As shown in block 250, the process flow 200 may include determining, for the secondary data log, a sum of incoming ad outgoing transactions. This step may be performed at the conclusion of a predefined time period. In some embodiments, the conclusion of the predefined time period is at the end of a business day. In some embodiments, the conclusion of the predefined time period is at the end of a business week.

As shown in block 260, the process flow 200 may include recording, on the primary data log, the sum from the secondary data log.

Process flow 200 may include additional embodiments, such as any single embodiment or any combination of embodiments described below and/or in connection with one or more other processes described elsewhere herein.

In a first embodiment, the process flow 200 may further include receiving a request from a user, wherein the request comprises a predetermined time period. In some embodiments, the user may be requesting a specified (or predetermined) time period wherein their data transactions will be processed via a secondary data log during the predetermined time period.

In a second embodiment alone or in combination with the first embodiment, the process flow 200 may further include, as shown in block 230, determining a pre-authorized credit for the at least one user. In some embodiments, the preauthorized credit is in an amount predetermined to be of use to the user during a predetermined time period. In some embodiments, the user may request a specific preauthorized credit. Additionally, or alternatively, the user may request a specific value for the preauthorized credit.

In a third embodiment alone or in combination with any of the first through second embodiments, the at least one user is determined using a machine learning algorithm. For example, the machine learning algorithm may be configured to determine a user having or a high volume of data transactions. Additionally, or alternatively, the machine learning algorithm may be configured to predict which users may have a high volume of data transactions. In some embodiments, the machine learning algorithm may predict which predetermined time period would be useful for the user to operate on the secondary data log.

In a fourth embodiment alone or in combination with any of the first through third embodiments, the preauthorized credit is determined using a machine learning algorithm. Foe example, the machine learning algorithm may be configured to predict the value of the preauthorized credit. Additionally, or alternatively, the machine learning algorithm may be configured to predict the time at which the preauthorized credit posts to the secondary data log.

In a fifth embodiment alone or in combination with any of the first through fourth embodiments, the distributed ledger may include a compressed chain of ownership of the electronic digital certificate. In some embodiments, the compressed chain of ownership makes up 1% of the electronic digital certificate.

In a sixth embodiment alone or in combination with any of the first through fifth embodiments, the secondary data log may comprise a decentralized or distributed ledger. In some embodiments, the secondary data log is a blockchain distributed ledger. In some embodiments, the secondary data log is a hash-graph distributed ledger.

In a seventh embodiment, alone or in combination with any one of the first through sixth embodiments, the secondary data log comprises a centralized ledger.

In an eight embodiment, alone or in combination with any one of the first through seventh embodiments, the data transaction occurs via a resource distribution instrument. In some embodiments, the resource distribution instrument is a peer-to-peer transaction system. In some embodiments, the user interacts with the resource distribution instrument using a mobile device.

Although FIG. 2 shows example blocks of process flow 200, in some embodiments, process flow 200 may include additional blocks, fewer blocks, different blocks, or differently arranged blocks than those depicted in FIG. 2. Additionally, or alternatively, two or more of the blocks of process flow 200 may be performed in parallel.

FIG. 3 illustrates an exemplary flow diagram for expedited data transfer utilizing a secondary data log, in accordance with an embodiment of the invention. The flow diagram 300 represents the flow of data transactions from user to destination utilizing the secondary data log system described herein. Outgoing data transactions, from user account 310, will be recorded on the secondary data log 320. Following summation at the conclusion of the predetermined time period, the data transaction totals will be recorded on the primary data log 330. From here, the data transactions will go to a clearinghouse 340, and ultimately distributed to the appropriate destinations 350. Additionally, or alternatively, incoming data transactions from destinations 350, will be passed via the clearinghouse 340 to the primary data log 330. From here the incoming data transactions will be recorded on the secondary data log. Upon the conclusion of the predetermined time period, the incoming transactions will be posted to, or recorded on, the user account 310.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for expedited data transfer, the system comprising
    at least one non-transitory storage device, and
    at least one processing device coupled to the at least one non-transitory storage device, wherein the at least one processing device is configured to:
        analyze an entity data log, wherein the entity data log comprises incoming data transactions for a group of users and outgoing data transactions for the group of users using a peer-to-peer transaction network and wherein the entity data log is stored on a distributed ledger;

forecast, using a machine learning algorithm, at least one user having a volume of data transactions;

forecast, using the machine learning algorithm, a predetermined time period, wherein the predetermined time period is based on data transactions during a defined timeframe;

determine the at least one user, from the group of users, having the volume of data transactions within the defined timeframe on the peer-to-peer transaction network via the machine learning algorithm to trigger a secondary data log on the distributed ledger;

receive a secondary data log request from the at least one user to utilize a secondary data log during the predetermined time period, wherein the secondary data log comprises a hash-graph distributed ledger and the secondary data log reduces entity log update frequencies;

determine, using the machine learning algorithm and a user preauthorized credit request, a preauthorized credit for the at least one user, based on the volume of data transactions within the defined timeframe;

forecast, using the machine learning algorithm, a time for transmitting the preauthorized credit to the secondary data log;

execute, via a resource distribution instrument, incoming data transactions for the at least one user and outgoing data transactions for the at least one user, wherein the resource distribution instrument comprises interactions via a mobile device;

maintain the secondary data log for the each of the at least one user during the predetermined time period, wherein the secondary data log comprises the incoming data transactions for the at least one user and the outgoing data transactions for the at least one user, wherein the secondary data log further comprises the preauthorized credit for the predetermined time period preventing real-time settlement for the volume of data transactions from the at least one user;

determine, upon conclusion of the predetermined time period, for the secondary data log, a sum of the outgoing data transactions and incoming data transactions; and record the sum on the entity data log and allow a remaining net amount to remain on the entity data log for additional transactions without performing settlement, wherein the record is compressed on the distributed ledger creating a compressed chain, wherein the compressed chain comprises a compressed chain of ownership of an electronic digital certificate, wherein the compressed chain of ownership comprises 1% of the electronic digital certificate.

2. The system for expedited data transfer according to claim 1, wherein the at least one processing device is configured to, prior to analyzing the entity data log, receive a request from the at least one user, wherein the request comprises the predetermined time period.

3. The system for expedited data transfer according to claim 1, wherein the secondary data log further comprises the preauthorized credit.

4. The system for expedited data transfer according to claim 1, wherein the resource distribution instrument further comprises account identifier data.

5. The system for expedited data transfer according to claim 3, wherein the user preauthorized credit request comprises a requested quantity.

6. The system for expedited data transfer according to claim 1, wherein the secondary data log is a distributed ledger.

7. The system for expedited data transfer according to claim 1, wherein the secondary data log is a centralized ledger.

8. A computer program product for expedited data transfer, the computer program product comprising a non-transitory computer-readable medium comprising code causing a first apparatus to:

analyze an entity data log, wherein the entity data log comprises incoming data transactions for a group of users and outgoing data transactions for the group of users using a peer-to-peer transaction network and wherein the entity data log is stored on a distributed ledger;

forecast, using a machine learning algorithm, at least one user having a volume of data transactions;

forecast, using the machine learning algorithm, a predetermined time period, wherein the predetermined time period is based on data transactions during a defined timeframe;

determine the at least one user, from the group of users, having the volume of data transactions within the defined timeframe on the peer-to-peer transaction network via the machine learning algorithm to trigger a secondary data log on the distributed ledger;

receive a secondary data log request from the at least one user to utilize a secondary data log during the predetermined time period, wherein the secondary data log comprises a hash-graph distributed ledger and the secondary data log reduces entity log update frequencies;

determine, using the machine learning algorithm and a user preauthorized credit request, a preauthorized credit;

forecast, using the machine learning algorithm, a time for transmitting the preauthorized credit to the secondary data log;

execute, via a resource distribution instrument, incoming data transactions for the at least one user and outgoing data transactions for the at least one user, wherein the resource distribution instrument comprises interactions via a mobile device;

maintain the secondary data log for the each of the at least one user during the predetermined time period, wherein the secondary data log comprises the incoming data transactions for the at least one user and the outgoing data transactions for the at least one user, wherein the secondary data log further comprises the preauthorized credit for the predetermined time period of time preventing real-time settlement for the volume of data transactions from the at least one user;

determine, upon conclusion of the predetermined time period, for the secondary data log, a sum of the outgoing data transactions and incoming data transactions; and record the sum on the entity data log and allow a remaining net amount to remain on the entity data log for additional transactions without performing settlement, wherein the record is compressed on the distributed ledger creating a compressed chain, wherein the compressed chain comprises a compressed chain of ownership of an electronic digital certificate, wherein the compressed chain of ownership comprises 1% of the electronic digital certificate.

9. The computer program product for expedited data transfer according to claim 8, wherein the non-transitory computer-readable medium comprises code causing the first apparatus to, prior to analyzing the entity data log, receive a request from the at least one user, wherein the request comprises the predetermined time period.

10. The computer program product for expedited data transfer according to claim 8, wherein secondary data log further comprises the preauthorized credit.

11. The computer program product for expedited data transfer according to claim 8, wherein the resource distribution instrument further comprises account identifier data.

12. The computer program product for expedited data transfer according to claim 10, wherein the user preauthorized credit request comprises a requested quantity.

13. The computer program product for expedited data transfer according to claim 8, wherein the secondary data log is a distributed ledger.

14. The computer program product for expedited data transfer according to claim 8, wherein the secondary data log is a centralized ledger.

15. A method for expedited data transfer, the method comprising:
providing a computing system comprising a computer processing device and a non-transitory computer readable medium, where the computer readable medium comprises configured computer program instruction code, such that when said instruction code is operated by said computer processing device, said computer processing device performs the following operations:
analyzing an entity data log, wherein the entity data log comprises incoming data transactions for a group of users and outgoing data transactions for the group of users using a peer-to-peer transaction network and wherein the entity data log is stored on a distributed ledger;
forecasting, using a machine learning algorithm, at least one user having a volume of data transactions;
forecasting, using the machine learning algorithm, a predetermined time period, wherein the predetermined time period is based on data transactions during a defined timeframe;
determining the at least one user, from the group of users, having the volume of data transactions within the defined timeframe on the peer-to-peer transaction network via the machine learning algorithm to trigger a secondary data log on the distributed ledger;
receiving a secondary data log request from the at least one user to utilize a secondary data log during the predetermined time period, wherein the secondary data log comprises a hash-graph distributed ledger and the secondary data log reduces entity log update frequencies;
determining, using the machine learning algorithm and a user preauthorized credit request, a preauthorized credit;
forecasting, using the machine learning algorithm, a time for transmitting the preauthorized credit to the secondary data log;
executing, via a resource distribution instrument, incoming data transactions for the at least one user and outgoing data transactions for the at least one user, wherein the resource distribution instrument comprises interactions via a mobile device;
maintaining the secondary data log for each of the at least one user during the predetermined time period, wherein the secondary data log comprises the incoming data transactions for the at least one user and the outgoing data transactions for the at least one user, wherein the secondary data log further comprises the preauthorized credit for the predetermined time period of time preventing real-time settlement for the volume of data transactions from the at least one user;
determining, upon conclusion of the predetermined time period, for the secondary data log, a sum of the outgoing data transactions and incoming data transactions; and
recording the sum on the entity data log and allow a remaining net amount to remain on the entity data log for additional transactions without performing settlement, wherein the record is compressed on the distributed ledger creating a compressed chain, wherein the compressed chain comprises a compressed chain of ownership of an electronic digital certificate, wherein the compressed chain of ownership comprises 1% of the electronic digital certificate.

16. The method for expedited data transfer according to claim 15, wherein the method further comprises, prior to analyzing the entity data log, receiving a request from the at least one user, wherein the request comprises the predetermined time period.

17. The method for expedited data transfer according to claim 15,
wherein the secondary data log further comprises the preauthorized credit.

18. The method for expedited data transfer according to claim 15, wherein the resource distribution instrument further comprises account identifier data.

19. The method for expedited data transfer according to claim 17, wherein the user preauthorized credit request comprises a requested quantity.

20. The method for expedited data transfer according to claim 15, wherein the secondary data log is a distributed ledger.

* * * * *